(12) United States Patent
Maheu et al.

(10) Patent No.: US 7,727,106 B2
(45) Date of Patent: Jun. 1, 2010

(54) CONTINUOUSLY VARIABLE TRANSMISSION

(75) Inventors: Pierre Maheu, 6567, rue de Bordeaux, Montreal, Quebec (CA) H2G 2S2; Jean-François Dahmé, Marieville (CA)

(73) Assignee: Pierre Maheu, Montreal (CA)

( * ) Notice: Subject to any disclaimer, the term of this patent is extended or adjusted under 35 U.S.C. 154(b) by 1241 days.

(21) Appl. No.: 11/240,513

(22) Filed: Oct. 3, 2005

(65) Prior Publication Data

US 2006/0073936 A1 Apr. 6, 2006

Related U.S. Application Data

(60) Provisional application No. 60/614,464, filed on Oct. 1, 2004.

(51) Int. Cl.
*F16H 15/38* (2006.01)
(52) U.S. Cl. .................................. 476/1; 476/5; 476/40
(58) Field of Classification Search .................... 476/1, 476/40–46, 5
See application file for complete search history.

(56) References Cited

U.S. PATENT DOCUMENTS

| 4,386,536 | A | | 6/1983 | Kraus |
|---|---|---|---|---|
| 4,735,430 | A | | 4/1988 | Tomkinson |
| 5,236,403 | A | | 8/1993 | Schievelbusch |
| 5,273,501 | A | | 12/1993 | Schievelbusch |
| 5,597,056 | A | * | 1/1997 | Blake ..................... 192/217.4 |
| 6,071,209 | A | | 6/2000 | Greenwood |

FOREIGN PATENT DOCUMENTS

EP 1359344 A2 4/2003

* cited by examiner

*Primary Examiner*—William C Joyce

(57) ABSTRACT

A variable ratio transmission for mechanically coupling an input member to an output member, the variable ratio transmission allowing the conversion of an input rotational motion of the input member into an output rotational motion of the output member, the input rotational motion having an input speed and an input torque and the output rotational motion having an output speed and an output torque. The variable ratio transmission includes a variable ratio transmission assembly mechanically coupled to the input member and to the output member for rotating the output member at the output speed in response to the input member being rotated at the input speed, the variable ratio transmission assembly defining a transmission ratio between the output speed and the input speed, the transmission ratio being variable; and a ratio controller mechanically coupled to the variable ratio transmission assembly and to the input member for automatically adjusting the transmission ratio as a function of the input torque.

10 Claims, 7 Drawing Sheets

CONTINUOUSLY VARIABLE TRANSMISSION

This application claims priority from U.S. Provisional Patent Application Ser. No. 60/614,464 filed Oct. 1, 2004.

FIELD OF THE INVENTION

The present invention relates to transmissions. More specifically, the present invention is concerned with a continuously variable transmission.

BACKGROUND OF THE INVENTION

Transmissions allow the variation of a ratio of rotation speeds between an input and output. As such, they allow controlling the rotation speed at their output when the input speed is either larger or smaller than the output speed.

In many applications, the input speed is determined by a power band of a power source connected to the input of the transmission. Indeed, many power sources provide an optimal torque or power over only a limited range of rotation speeds. For example, this is the case wherein the power source is an animal or a human.

Typically, humans provide power for locomotion or other purposes through a repetitive movement. In this document, each cycle of the repetitive movement is referred to as a stroke. For example, for a human pedaling a bicycle, the stroke corresponds to a complete turn of the cranks and pedals with respect to the crank axle. In another example, if the human is propelling a wheelchair, the stroke includes the motion of each arm of the human as it grabs the wheel, pushes onto the wheel, releases the wheel and gets back to a position wherein the cycle starts over.

Because of anatomically caused geometric constraints, inertial effects and muscle physiology, among other causes, humans typically produce an optimal amount of power only over a limited range of stroke frequencies. In addition, in most motions, power is not uniformly produced over the duration of the stroke. For example, in the case of a bicycle, almost no propulsive power is produced when the leg of a cyclist is at the top or the bottom of a pedaling motion, or in other words around the maximal and minimal knee flexion. Also, in the case of a wheelchair, almost no power is produced at the beginning or at the end of the wheel propulsion cycle, while maximal force is exerted in the vicinity of the middle of the propulsion cycle wherein the arms of the user are in proximity to a top portion of the wheels.

In many situations wherein humans produce power, for example for locomotion, an apparatus receiving the motion includes a transmission for matching the relatively narrow range of frequencies of efficient strokes to the desired speed of locomotion. For example, to match a relatively narrow range of frequencies at which a human can pedal a bicycle, gears are provided such that for a relatively constant stroke frequency, the bicycle travels over a wide range of speeds.

However, in most bicycle transmissions currently available, the gears come in discreet steps. Accordingly, there is the need to either have a very large number of gears such that the bicycle can be pedaled efficiently at all speeds, or alternatively, there is a need for the human to produce a suboptimal power as a limited number of gears requires that the human produces strokes over a relatively broad interval of stroke frequencies.

The few continuously variable transmissions (CVTs) that have been proposed for bicycles are typically too heavy and too inefficient to be suitable to their intended use.

In addition, many solutions have been proposed to reduce the duration of phases in a stroke that contribute relatively little to power production. These phases are typically known as "dead spots", and many systems have been conceived to reduce, as much as possible, their presence in the pedaling cycle. An example of such a system includes the use of elliptical chain rings on a bicycle that increase a velocity of the pedals in the vicinity of the dead spots such that the human pedaling the bicycle stays for a relatively small amount of time in the vicinity of the dead spots. Unfortunately, most of the proposed devices for reducing dead spots are relatively inefficient and typically fall into disuse after only a few years on the market.

An area wherein this problem is even greater is in the field of wheelchairs. Typically, an intended user propels a wheelchair through either direct contact with the wheel or through contact with a handrim. The handrim and the wheel are conventionally fixed with respect to each other. Accordingly, there is no means for adapting rotation speeds of the handrim or wheel to the requirements of the human in wheelchairs. In addition, dead spots in the strokes used to propel wheelchairs are also relatively important and typically the intended can better propel a wheelchair only through the development of technique and strength.

The above discussion is mainly concerned with human powered vehicles. However, similar problems are encountered in many other human power applications and in motor-driven applications.

Against this Background, there Exists a Need in the Industry to Provide a Novel Continuously Variable Transmission.

An object of the present invention is therefore to provide an improved continuously variable transmission.

SUMMARY OF THE INVENTION

More specifically, in accordance with the present invention, there is provided a variable ratio transmission for mechanically coupling an input member to an output member, the variable ratio transmission allowing the conversion of an input rotational motion of the input member into an output rotational motion of the output member, the input rotational motion having an input speed and an input torque and the output rotational motion having an output speed and an output torque. The variable ratio transmission includes:

a variable ratio transmission assembly mechanically coupled to the input member and to the output member for rotating the output member at the output speed in response to the input member being rotated at the input speed, the variable ratio transmission assembly defining a transmission ratio between the output speed and the input speed, the transmission ratio being variable; and a ratio controller mechanically coupled to the variable ratio transmission assembly and to the input member for automatically adjusting the transmission ratio as a function of the input torque.

In some embodiments of the invention, the ratio controller includes an actuating member mechanically coupled to the input member; and a ratio defining component including a ratio defining surface, the ratio defining component being mechanically coupled to the actuating member and to the variable ratio transmission assembly for transmitting the input torque to the variable ratio transmission assembly, the ratio defining surface being disposed such that a variation in the input torque causes a predetermined variation of the transmission ratio.

In some embodiments of the invention, the transmission ratio is further automatically adjusted as a function of the output speed.

Advantageously, the transmission automatically adjusts its transmission ratio according to its environment and to the torque available at its input.

Also, the transmission ratio is adjustable continuously and can be varied as a function of a phase of the input rotation.

The transmission is relatively compact, light and robust and is manufacturable at a relatively low cost.

Furthermore, in some embodiments of the invention, the transmission does not require any external power source to vary its transmission ratio. In this case, an embodiment of the invention including only mechanical components, as opposed to electronic components, is particularly advantageous.

In another broad aspect, the invention provides a variable ratio transmission for mechanically coupling an input member to an output member, the variable ratio transmission allowing the conversion of an input rotational motion of the input member into an output rotational motion of the output member, the input rotational motion having an input speed and an input torque and the output rotational motion having an output speed and an output torque. The variable ratio transmission includes:
- variable ratio transmission means mechanically coupled to the input member and to the output member for rotating the output member at the output speed in response to the input member being rotated at the input speed, the variable ratio transmission means defining a transmission ratio between the output speed and the input speed, the transmission ratio being variable; and
- ratio controlling means mechanically coupled to the variable ratio transmission assembly and to the input member for automatically adjusting the transmission ratio as a function of the input torque.

In yet another broad aspect, the invention provides a method for providing power to a wheel of a human powered vehicle, the human powered vehicle including a rotatable actuator rotatable by an input torque provided by human being and a variable ratio transmission for transmitting power received at the actuator to the wheel. The method includes:
- using human power to drive the wheel;
- automatically adjusting a transmission ratio of the variable ratio transmission as a function of the input torque.

Other objects, advantages and features of the present invention will become more apparent upon reading of the following non-restrictive description of preferred embodiments thereof, given by way of example only with reference to the accompanying drawings.

DETAILED DESCRIPTION

Figure 4:
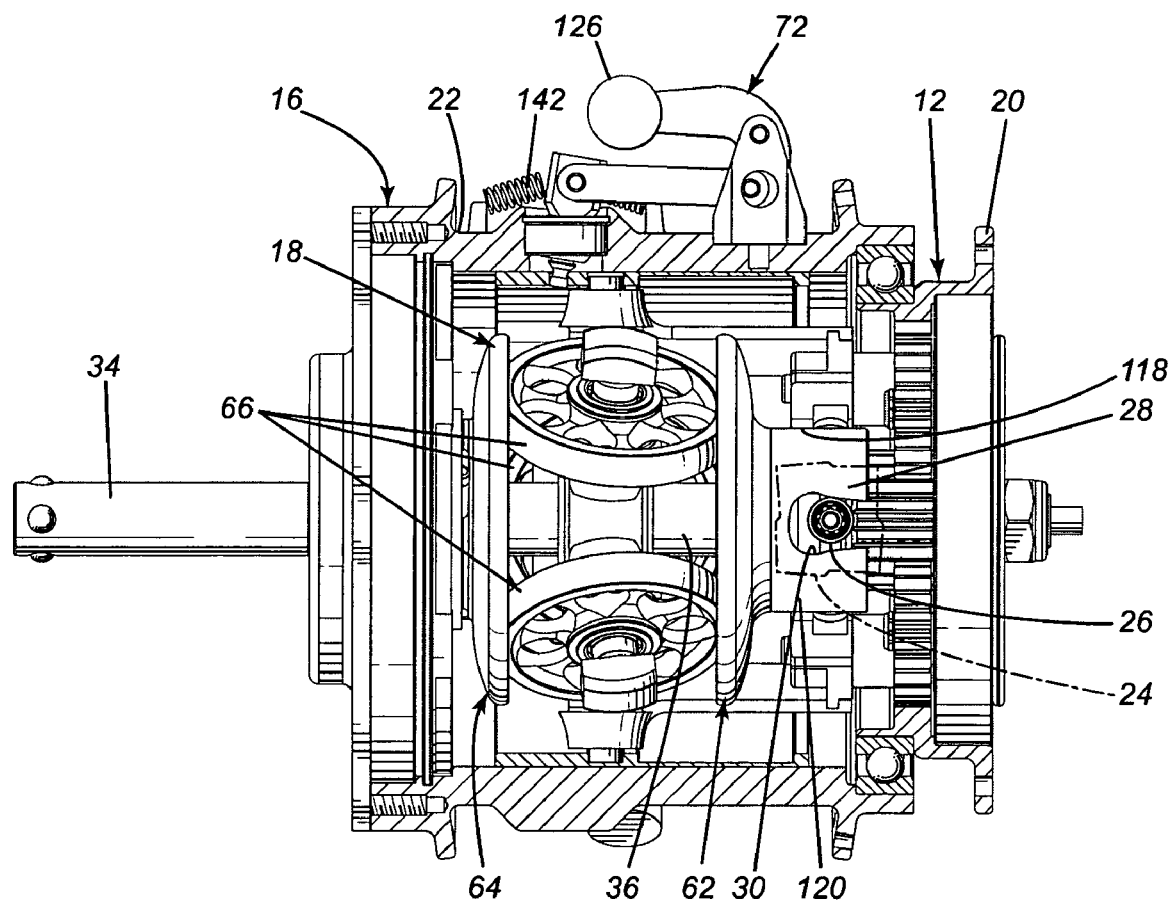
FIG. 4, in a partially exploded side elevation view, illustrates the transmission of FIG. 1.

FIG. 4 illustrates a variable ratio transmission 10 for receiving an input rotational motion having an input speed and a corresponding input torque, and for providing an output rotational motion having an output speed and a corresponding output torque. The variable ratio transmission 10 includes an input stage 12 receiving the input rotational motion. The variable ratio transmission 10 also includes an intermediate stage 14 including a variable ratio transmission assembly 18, the intermediate stage 14 being mechanically coupled to the input stage 12. The variable ratio transmission 10 further includes an output stage 16 mechanically coupled to the intermediate stage 14. The output stage 16 provides the output rotational motion.

The variable ratio transmission 10 mechanically couples an input member 20 of the input stage 14 to an output member 22 of the output stage 16 and allows the conversion of an input rotational motion of the input member 20 into an output rotational motion of the output member 22. The input rotational motion has an input speed and an input torque, and the output rotational motion has an output speed and an output torque.

In the variable ratio transmission 10, the variable ratio transmission assembly 18 is mechanically coupled to the input member 20 and to the output member 22 for rotating the output member 22 at the output speed in response to the input member 20 being rotated at the input speed. The variable ratio transmission assembly 18 defines a transmission ratio between the output speed and the input speed, the transmission ratio being variable.

The variable ratio transmission 10 includes a ratio controller 24 mechanically coupled to the variable ratio transmission assembly 18 and to the input member 20 for automatically adjusting the transmission ratio as a function of the input torque.

The ratio controller 24 includes an actuating member 26 mechanically coupled to the input member 20 and a ratio defining component 28. The ratio defining component 28 includes a ratio defining surface 30. The ratio defining component 28 is mechanically coupled to the actuating member 26 and to the said variable ratio transmission assembly 18 for transmitting the input torque to the variable ratio transmission assembly 18, the ratio defining surface 30 being disposed such that a variation in the input torque causes a predetermined variation of said transmission ratio.

Furthermore, in some embodiments of the invention, the variable ratio transmission 10 includes a speed dependent ratio adjusting assembly 32 mechanically coupled to the variable ratio transmission assembly 18, the speed dependent ratio adjusting assembly 32 being configured such that a variation in the output speed causes another predetermined variation of the transmission ratio. In other embodiments of the invention, the transmission ratio of the variable ratio transmission assembly 18 is varied both as a function of both the input torque and the output speed. Accordingly, the variable ratio transmission 10 is an automatic transmission.

In a specific example of implementation shown in the drawings, the ratio controller 24 reduces the transmission ratio of the variable ratio transmission 10 when the input torque increases, which consequently reduces the input torque required to exert a given output torque. Conversely, the ratio controller 24 increases the transmission ratio of the variable ratio transmission 10 when the input torque diminishes, which therefore increases the input torque required to produce a given output torque.

Consequently, a variety of output torques is produced for a given input torque. With a suitable and non-limiting choice of ratio controller 24, the input torque stays relatively constant as a function of the output torque required to propel a vehicle.

In the specific example of implementation shown in the drawings, the speed dependent ratio adjusting assembly 32 increases the transmission ratio when the output speed increases. Conversely, when the output speed diminishes, the ratio controller reduces the transmission ratio. Therefore, the input speed varies substantially less than the output speed as a function of the output speed. For a suitable and non-limiting choice of controller, the input speed stays relatively constant over a relatively wide range of output speeds.

In the present document, inputs and outputs have been arbitrarily defined, but the reader skilled in the art will readily appreciate that in some embodiments of the invention, the input and the output stages 12 and 16 of the transmission are reversible without causing any damage or significant reduction in efficiency. However, as will be described in further details hereinbelow, the input and output convention chosen for this document is particularly suitable to a logical description wherein the transmission is in a hub of a wheel.

In view of the above, the variable ratio transmission 10 is suitable for use in at least some human powered applications, for example in wheelchairs, bicycles and unicycles, among others. However, the variable ratio transmission 10 is also suitable for use in non-human powered applications, such as, for example and non-limitatively, in motorized scooters, robots, gyro-unicycles, submarines and go-karts, among others.

For example, if the transmission is used in a bicycle, an increase in an input torque at constant speed might represent an increase in resistance to motion of the bicycle caused for example by wind. In this case, it is desired that the transmission ratio becomes smaller such that for a constant effort, the frequency of pedaling stays relatively constant. Conversely, if, for example, the bicycle starts to roll down a hill, the output rotational motion increases in speed. In this case, it is desired that once again the pedaling frequency stays relatively constant in spite of the increase in the output rotation speed. In this case, an increase in the transmission ratio is therefore desired.

Such an increase in the transmission ratio, however, causes an increase in the input torque required to keep the bicycle moving. As it is well known, a bicycle requires a larger amount of power for traveling at high speeds than at low speeds. Therefore, this increase in torque for a constant pedaling speed implies that when the bicycle goes faster there is a need to get more power into the propulsion of the bicycle.

In another example, the variable ratio transmission 10 is a transmission for a wheelchair. In this case, the transmission is useful both to reduce dead spots and to adapt a torque required to move the wheelchair to the torque output at the wheel.

For example, if the wheelchair moves from a relatively hard surface to a relatively soft surface, the output torque required to maintain a given speed increases. In this case, the transmission ratio is automatically decreased such as to keep constant the torque required at the input.

Also, in wheelchairs, the input torque is not uniformly distributed over the stroke. At the beginning of the stroke, there is little torque available at the input member 20. Therefore, since the input torque is low, the ratio controller 24 reduces the transmission ratio of the variable ratio transmission 10, which augments the input speed and consequently helps in getting through the dead spot in the stroke.

Conversely, at the middle of the stroke, torque is maximal and therefore the ratio controller 24 increases the transmission ratio of the variable ratio transmission 10, which allows the user to be within a phase of the stroke during which input torque is maximal for a longer duration.

Although two examples of human powered propulsion have been described hereinabove, the variable ratio transmission 10 is usable in many applications, some of them not human powered. In addition, although specific examples have been given as to the benefits of the variable ratio transmission 10 in human powered examples, these benefits should not be construed as constraints on the transmission.

In some applications, the above-described theory given regarding the operation of the transmission is inapplicable. The reader skilled in the art will readily appreciate that even in these cases, the scope of the present invention is not reduced by the shortcomings of any theory used to describe and understand the operation of the variable ratio transmission 10.

The variable ratio transmission 10 is described in further details hereinbelow. In the following text, some components are described as non-rotating, some components are described as having a direct rotation and some components are described as having a counter rotation. This convention is only used to facilitate the comprehension of the mechanism of the variable ratio transmission 10, and should not be construed in any way as constraints on the use of the variable ratio transmission 10.

Specifically, it is be assumed that an axle 34, to be described in further details hereinbelow, is not rotating with respect to a vehicle or any other component to which it is attached. This non-rotation of the axle 34 constrains the movements of the other parts of the transmission. Directly rotating transmission components are components that rotate around the axle 34 in the same direction as the input member 20. Counter-rotating components rotate in the opposite direction.

Figure 1:
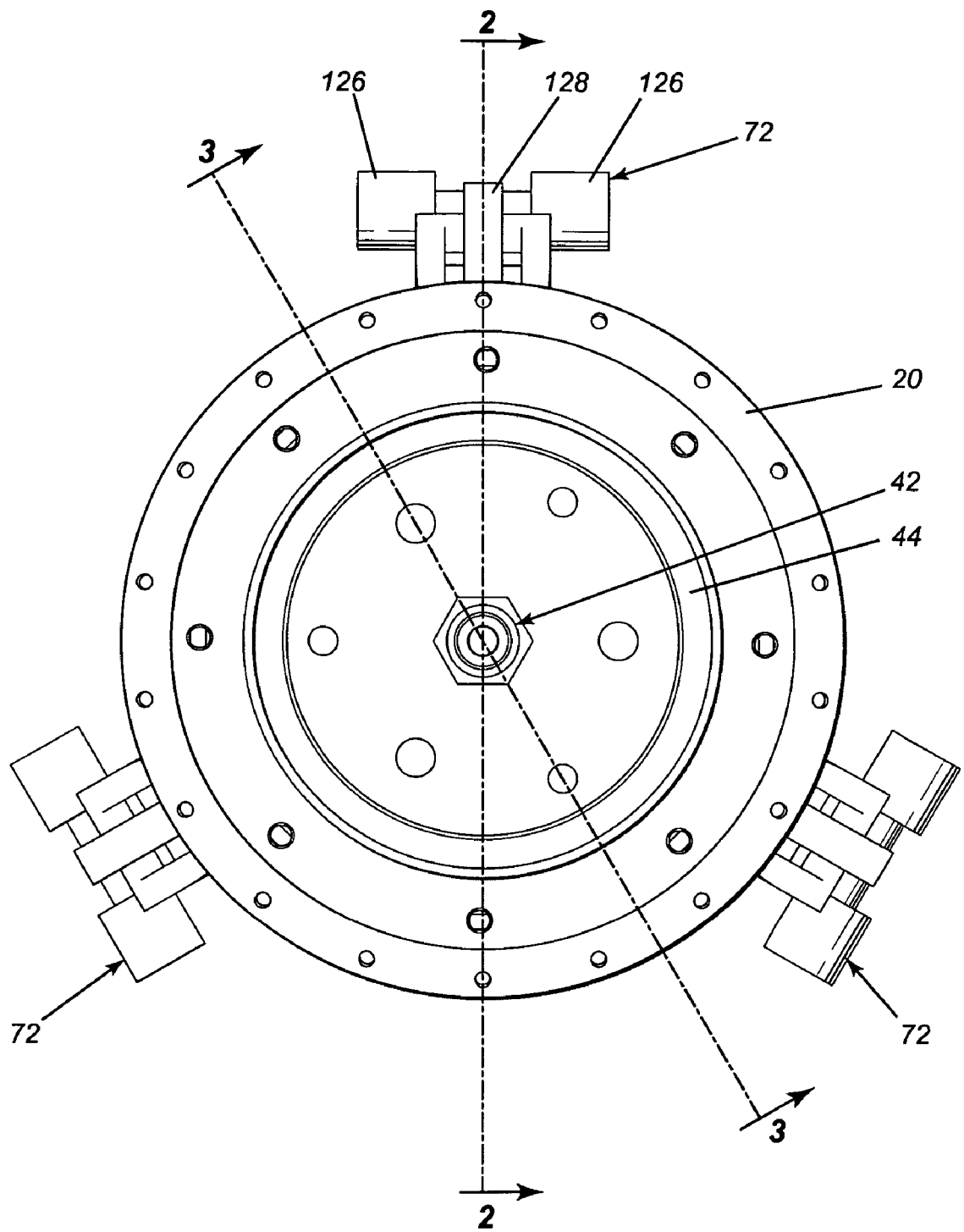
FIG. 1, in a front elevation view illustrates a continuously variable transmission according to an embodiment of the present invention.
Figure 2:
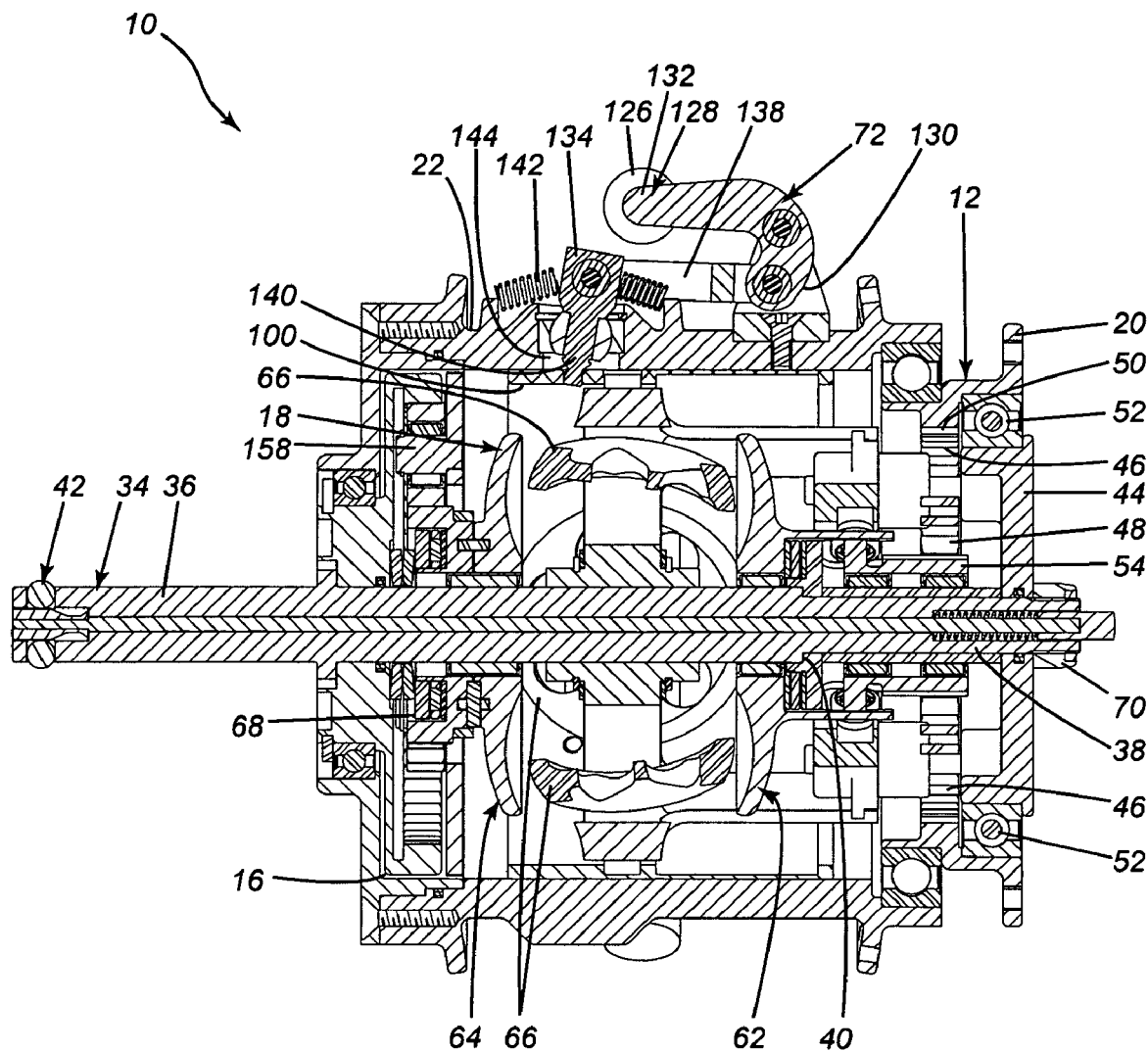
FIG. 2, in a side cross-sectional along the line 2-2 of FIG. 1, illustrates the continuously variable transmission of FIG. 1.
Figure 3:
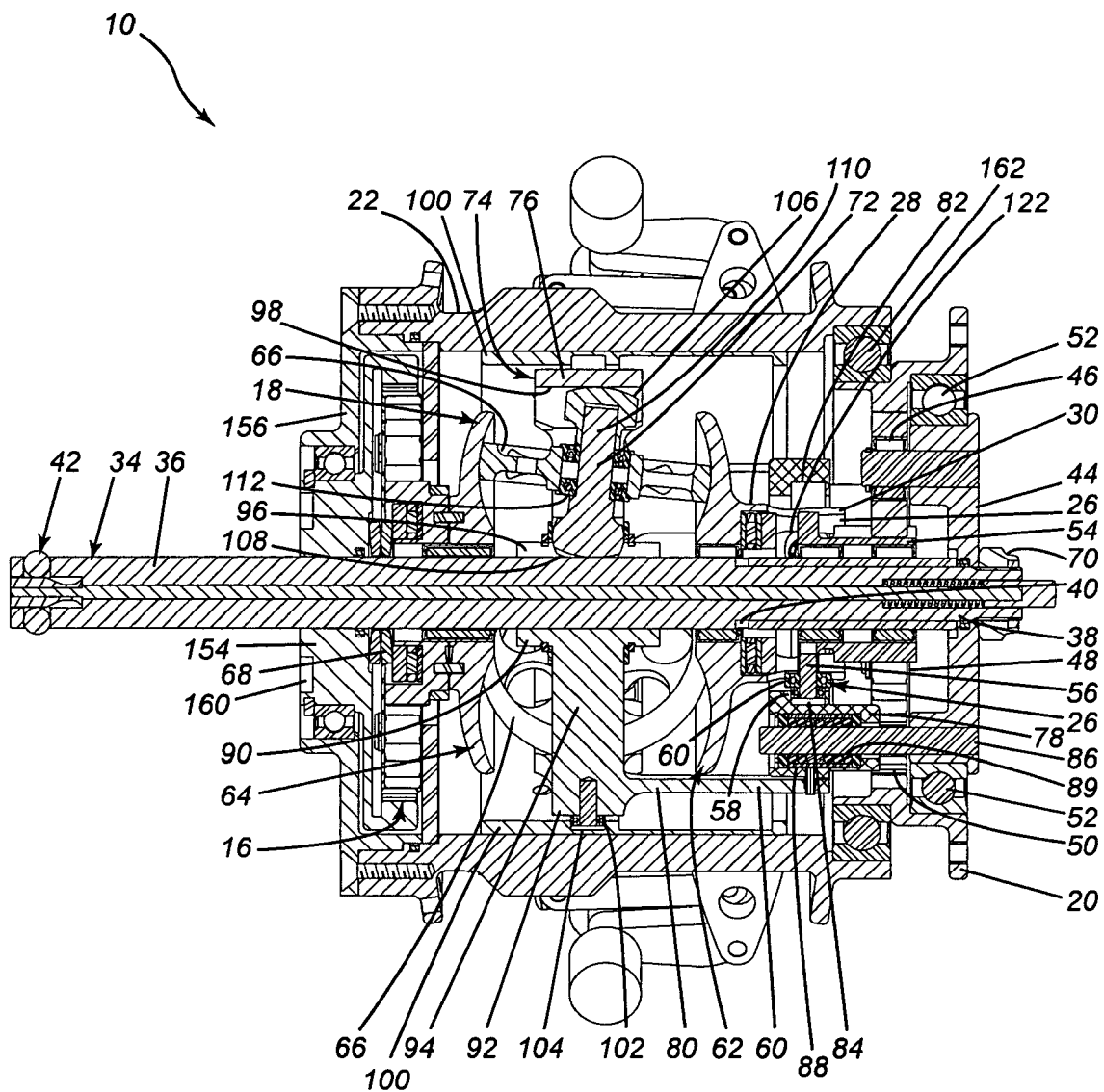
FIG. 3, in a side cross-sectional along the line 3-3 of FIG. 1, illustrates the continuously variable transmission of FIG. 1.

Referring to FIGS. 2 and 3, the input and output stages 12 and 16 each include a planetary gear train. The planetary gear train of the input stage has a transmission ratio larger than one, while the planetary gear train of the output stage has a transmission ratio smaller than one.

In other words, the input stage 12 drives the variable ratio transmission assembly 18 at a variable ratio transmission assembly input rotational speed and increases the variable ratio transmission assembly input speed by a first predetermined factor relatively to the input rotational speed. The output stage 16 is driven by the variable ratio transmission assembly 14 at a variable ratio transmission assembly output rotational speed, the output stage 16 decreasing the variable transmission assembly output speed by a second predetermined factor relatively to the output rotational speed.

In the specific embodiment of the invention shown in the drawings, the first and second predetermined factors are substantially equal and the multiplication of the transmission ratio of the input and output stages 12 and 16 gives the number one. Accordingly, the planetary gear trains of the input and output stages 12 and 16 increase the speed of rotation of the variable ratio transmission assembly 18 and do not, by themselves, have a transmission ratio differing from unity. This increase in the rotation speed in the variable ratio transmission assembly 18 allows reducing a torque exerted between the components of the variable ratio transmission assembly 18, which allows for the manufacturing of a relatively light transmission that is nonetheless relatively durable and efficient.

The choice of the transmission ratios of the gear trains in the input and output stages 12 and 16 depends on the application in which the variable ratio transmission 10 is used and will be easily determined by the reader skilled in the art.

The axle 34 includes a proximal segment 36 and a distal segment 38. A diameter of the proximal segment 36 is larger than a diameter of the distal segment 38. At a transition between the proximal and distal segments 36 and 38, the axle 34 defines a flange 40.

The axle 34 further includes a quick-release mechanism 42 for releasably attaching the axle 34 to an external device (not shown in the drawings). The quick-release mechanism 42 is any suitable quick-release mechanism. In alternative embodiments of the invention no quick-release mechanism is included in the axle 34 and the axle 34 is attachable to the external device in any other suitable manner.

The input stage 12 includes a planetary gear train mechanically coupled to the actuating member 26 (not shown in FIG. 2) for transmitting power to the variable ration transmission assembly 18. The planetary gear train includes a non-rotating stator 44 connected to the axle 34. Three planetary gears 46 (only 2 of which are visible on FIGS. 2 and 3) are each rotatably mounted onto the stator 44. The planetary gear train further includes a sun gear 48 and a peripheral gear 50 that each engages the planetary gears 46.

The sun gear 48 is rotatably mounted onto the axle 34 such as to rotate in the direct direction. In addition, the sun gear 48 is mounted onto the axle 34 such as to be axially mobile onto the axle 34. The sun gear 48 extends longitudinally over a distance large than a longitudinal extension of the planetary gears 46 such as to be able to engage the planetary gears 46 when located at different longitudinal positions along the axle 34.

The planetary gears 46 are located peripherally with respect to the sun gear 48 and rotate in the counter direction. In addition, the peripheral gear 50 is provided peripherally both to the sun gear 48 and the planetary gears 24. The peripheral gear 50 rotates in the direct direction.

A rotational movement, and therefore power, is transmitted to the input stage 12 through the input member 20. The input member 20 is connected to a source of power, such as for example, to a chain of a bicycle or to a handrim of a wheelchair (not shown in the drawings), and to the peripheral gear 50. The input member 20 is rotatably mounted with respect to the stator 44 so as to rotate in the direct direction. To that effect, a bearing 52 is provided between the stator 44 and the input member 20.

A transmission ring 54 concentric with the axle 34 is rotatable in the direct direction with respect thereto. The transmission ring 54 extends from the sun gear 48 and these two components rotate at the same angular speed.

In the embodiment of the invention shown in the drawings, the actuating members 26 take the form of pins extending substantially radially outwardly from the transmission ring 54. Referring to FIG. 3, the actuating members 26 each include a central portion 56 and first and second peripheral portions 58 and 60. The central portion 56 is immobile with respect to the transmission ring 54, while the first and second peripheral portions 58 and 60 are rotatably mounted, for example through bearings, onto the central portion 56 such as to be rotatable around a rotation axis perpendicular to the axle 34. The first and second peripheral portions 58 and 60 are located at substantially adjacent longitudinal positions onto the central portion 56. The first and second peripheral portions 58 and 60 each engages a corresponding portion of the intermediate stage, as described hereinbelow. The variable ratio transmission 10 includes three actuating members 26 located substantially equidistantly on the transmission ring 54.

Still referring to FIG. 3, the variable ratio transmission assembly 18 includes a toroidal transmission. To that effect, the variable ratio transmission assembly 18 includes an input toric disc 62 and an output toric disc 64 rotatably supported around the axle 34 opposite to each other. The input and output toric discs 62 and 64 define therebetween an annular space of substantially circular cross-sections. Three motion transmitting traction rollers 66 are disposed in the annular space between the input and output toric discs 62 and 64 in substantially radial symmetry with respect to the axle 34.

The input and output toric discs 62 and 64, and the traction rollers 66, are pressed towards each other. One or more Belleville washers 68 (seen in FIG. 2) are used to provide a compression force. Specifically, the Belleville washers 68 are provided between the output tone disc 64 and the output stage 16 such as to be compressed upon assembly of the variable ratio transmission 10.

For example, the Belleville washers 68 are compressible through threading of a nut 70 onto the axle 34 at the distal segment 38. This nut 70 compresses the axle-supported components of the variable ratio transmission 10 towards each other. As it is well known, relatively large compression forces are typically required to provide non-slip conditions within toroidal transmissions. The use of the Belleville washers 68 allows obtaining the required compression force while keeping the variable ratio transmission 10 relatively easy to assemble. The reader skilled in the art will readily appreciate that the components of the variable ratio transmission 10 can be maintained onto the axle 34 in any other suitable manner.

The traction rollers 66 are mounted onto support members 72 that engage a transmission ratio control component 74 and abut against the axle 34. The transmission ratio control component 74 does not rotate with respect to the axle 34. However, the transmission ratio control component 74 is movable longitudinally relatively to the axle 34.

The transmission ratio control component 74 includes a support receiving portion 76 provided between the input and output toric discs 62 and 64 and actuating member receiving portion 78 connected to the first peripheral portions 58 of the actuating members 26. The support receiving portion 76 and the actuating member receiving portion 78 are connected through three connecting members 80. However, alternative embodiments of the invention include any suitable number of connecting members 80. The geometry of the transmission ratio control component 74 is such that there is substantially no interference to the rotational motions of components that rotate around the axle 34 from the non-rotating transmission ratio control component 74.

The actuating member receiving portion 78 includes a ring component 82 with a substantially radially symmetrical groove 84 formed therein for receiving the first peripheral portion 58 of the actuating members 26. In addition, the actuating member receiving portion 78 is supported within the variable ratio transmission 10 through axles 86 extending substantially longitudinally from the stator 30. To allow a translation movement of the actuating member receiving portion 78, axle-receiving portions 85 extending to the ring component 82 receive the axles 86. The axle-receiving portions 88 each include ball bearings 89 to facilitate a movement of the actuating member receiving portion 78 with respect to the axles 86. The groove 84 allows the ring component 82 to be a rotating component while the transmission ratio control component 74 is a non-rotating component.

The connecting members 80 take the form of substantially elongated members. However, in alternative embodiments of the invention, any alternative suitable connecting members 80 are used.

The support receiving portion 74 includes a central portion 90 and a peripheral portion 92 connected through substantially radially extending spokes 94. The central and peripheral portions 90 and 92 are substantially ring-shaped and respectively define opposed bores 96 and grooves 98 for receiving the supports 57.

The bores 96 and grooves 98 provide lateral and circumferential support to the support members 72 while allowing the support members 72 to be longitudinally mobile therein such as to allow the longitudinal movement of the transmission ratio control component 74 along the axle 34. The bores 96 of the central portion 90 allow the support members 72 to contact the axle 34.

The transmission ratio control component 74 is connected to a peripheral support 100. The peripheral support 100 moves longitudinally with the transmission ratio control component 74, but is directly rotating. To allow this rotation, support pins 102 engage a groove 104 formed within the peripheral support 100.

The connecting members 80 and the support receiving portion 74 are integrally formed and attached to the actuating member receiving portion 78. However, in alternative embodiments of the invention, the transmission ratio control component 74 is manufactured in any other suitable manner.

Each support member 72 includes two longitudinally opposed cams 106 and 108 interconnected through a central body 110. The central body 110 includes a bearing assembly 112 for rotatably mounting a traction roller 66 substantially perpendicularly the central body 110. Each cam 106 and 105 defines a respective face shaped substantially like a portion of a cylindrical surface centered on a center of the central body 110 and having a radius extending to these faces.

Each of the cams 106 is received by a corresponding groove 98. Similarly, each of the cams 108 is received by a corresponding bore 96. Although not essential in all embodiments of the invention, the cam 106 is detachable from the central body 110 while the cam 108 is integrally formed with the central body 110.

Substantially non-slip contact conditions between the cams 106 and 108, the grooves 98 and the axle 34 ensure that when the transmission ratio control component 74 moves longitudinally with respect to the axle 34, the support members 72 rotate around their center, which causes a rotation of the traction rollers 66 around an axis perpendicular to a rotation axis of the traction rollers 66. Therefore, the longitudinal motion of the transmission ratio control component 74 causes a transmission ratio of the variable ratio transmission assembly 18 to be varied.

The output toric disc 64 is connected to the output stage 16, as will be described in further details hereinbelow.

The transmission ratio of the variable ratio transmission assembly 18 is controlled at least in part by a ratio controller 24. The ratio controller 24 is sensitive to an input torque at the input toric disc 62, which depends on the torque at the input member 20 of the variable ratio transmission 10. In addition, the transmission ratio depends on a rotation speed of the output disc 64, which depends on the rotation speed at the output of the variable ratio transmission 10. The transmission ratio of the variable ratio transmission assembly 18 is adjusted by a suitable translation of the transmission ratio control component 74 longitudinally relatively to the axle 34, which modifies the angle of the support members 72 with respect to the axle 34.

The actuating member 26 is mechanically coupled to the variable ratio transmission assembly 18 in a manner such that a movement of the actuating member 26 relatively to the ratio defining surface 30 causes a predetermined variation of the transmission ratio. For example, the actuating member 26 is mechanically coupled to the ratio defining component 28 such that the variation in the input torque causes the actuating member 26 to move in a predetermined direction relatively to the ratio defining component 28. In some embodiments of the invention, as shown in the drawings, the predetermined direction is substantially longitudinal.

Figure 5A:
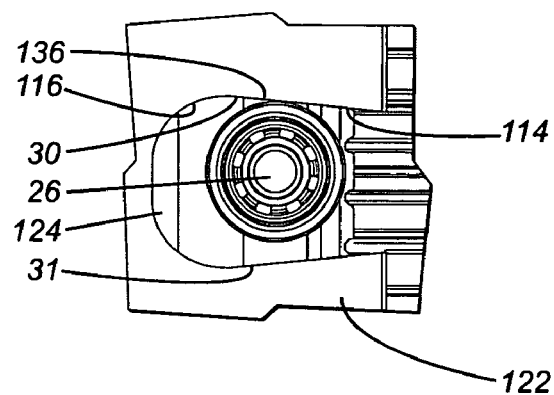
FIG. 5A, in a side elevation view, illustrates a ratio defining surface of the transmission of FIG. 1.

Referring to FIG. 5A, the actuating member 26 is movable along the ratio defining surface 30 between a high ratio position 114 wherein the transmission ratio is maximal and a low ratio position 116 wherein the transmission ratio is minimal.

The ratio defining component 28 includes a substantially cylindrical shell 118 defining a longitudinal axis, the cylindrical shell 118 defining a shell external surface 120 (shown in FIG. 4) and a shell internal surface 122 (shown in FIG. 3). Returning to FIG. 5A, the cylindrical shell 118 includes an aperture 124 extending between the shell external 120 and the shell internal surface 122, the ratio defining surface 30 extending at the periphery of the aperture 124 between the shell internal surface 120 and the shell external surface 122. The ratio defining surface 30 has a pitch relatively to the longitudinal axis The first peripheral portion 58 forms a roller rollable onto the ratio defining surface 30. However, in alternative embodiments of the invention, the actuating member 26 engages the ratio defining surface 30 in any other suitable manner. For example, the actuating member may slide onto the ratio defining surface 30.

As shown in the drawings, in some embodiments of the invention, the cylindrical shell 118 extends integrally from the input tone disc 62. The apertures 124 extend within the cylindrical shell 118 towards the input toric disc 62. The apertures 124 each include two ratio defining surface 30 and 31. The ratio defining surface 31 allows the variable ratio transmission 10 to function properly if the direction of rotation of the input member 20 is reversed. However, in alternative embodiments of the invention, only one ratio defining surface 30 is provided.

The ratio defining surfaces 30 and 31 are not parallel to the longitudinal axis between the low ratio position 116 and the high ratio position. The ratio defining surfaces 30 and 31 rotate circumferentially around the cylindrical shell 118 as they progress longitudinally, which defines a pitch. For more clarity, the pitch is by definition a distance over which a complete revolution would be made if the ratio defining surfaces 30 and 31 extended over a sufficient longitudinal extension. In some embodiments of the invention, as illustrated in FIG. 5A, the pitch is constant between the high ratio position 114 and the low ratio position 116.

Figure 5B:
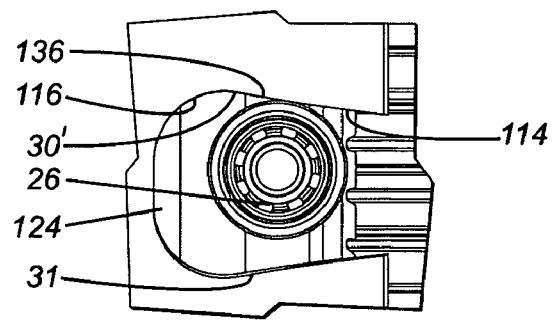
FIG. 5B, in a side elevation view, illustrates an alternative ratio defining surface of the transmission of FIG. 1.
Figure 5C:
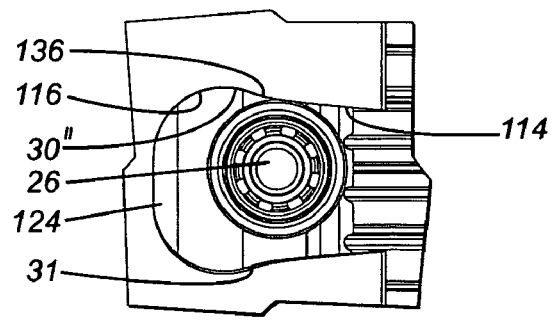
FIG. 5C, in a side elevation view, illustrates another alternative ratio defining surface of the transmission of FIG. 1.

However, in alternative embodiments of the invention, the pitch is not a constant. For example, referring to FIG. 5B In other embodiments of the invention, an alternative ratio defining surfaces 30' and 31' define a pitch that decreases linearly between the high ratio position 114 and the low ratio position 116. In yet other embodiments of the invention, as shown in FIG. 5C, other alternative ratio defining surfaces 30" and 31" define a pitch that decreases sinusoidally between the high ratio position 114 and the low ratio position 116.

An advantage of having a constant pitch resides in the ease of manufacturing the variable ratio transmission 10. An advantage of having pitches that vary along the ratio defining surface 30 reside in that the transmission ratio versus rotation speed and input torque characteristics of the variable ratio transmission 10 can be adapted to the biomechanics and physiology of the user of the variable ratio transmission 10.

As better seen from FIG. 2, the variable ratio transmission 10 further includes at least one rotation speed sensitive component 72. In the variable ratio transmission 10, the rotation speed sensitive component 72 includes at least one mass 126 pivotably mounted to the output member 22 through a lever 128 having a lever first end 130 and a lever second end 132. The lever 128 is substantially L-shaped and mounted to the output member 22 at a lever mounting position intermediate the lever first and second ends 130 and 132. The lever 125 mounts the mass 126 so that the mass 126 is movable radially. The mass 126 moves radially in response to a centrifugal acceleration present when the output member 22 rotates.

The lever 128 is coupled to the peripheral support 100 through a lever-to-support coupling assembly 134 in a manner such that an increase in rotation speed moves the peripheral support 100 so that the transmission ratio is increased.

In some embodiments of the invention, a biasing element biases the peripheral support 100 so that the actuating member 26 is biased towards an equilibrium position 136 (shown in FIG. 5A). For example, the equilibrium position 136 is intermediate the high and low ratio positions 114 and 116. The equilibrium position 136 is a position at which the actuating member 26 contacts the ratio defining surface 30 when the output speed and input torque are equal to zero. However, in alternative embodiments of the invention, the biasing element biases the actuating member 26 towards any other suitable position.

The lever-to-support coupling assembly includes first and second coupling assembly levers 138 and 140 pivotally coupled to each other. The first coupling assembly lever 138 is further pivotally coupled to the lever 128. The second coupling assembly lever 140 engages the peripheral support 100 so that a movement of the mass 126 results in a substantially longitudinal movement of the peripheral support 100, which therefore changes the transmission ratio as a function of the output rotational speed. The second coupling assembly lever 140 extends between the first coupling assembly lever 138 and the peripheral support 100 through an output member aperture 144 extending substantially radially through the output member 22.

In some embodiments of the invention, the biasing element includes two springs 142, for example coil springs, provided between the output member 22 and the second coupling assembly member 140. The springs 142 each bias the second coupling assembly member 140 in opposite directions. The configuration and compressibility of the springs 142 determine, at least in part, the equilibrium position 136.

Figure 6A:
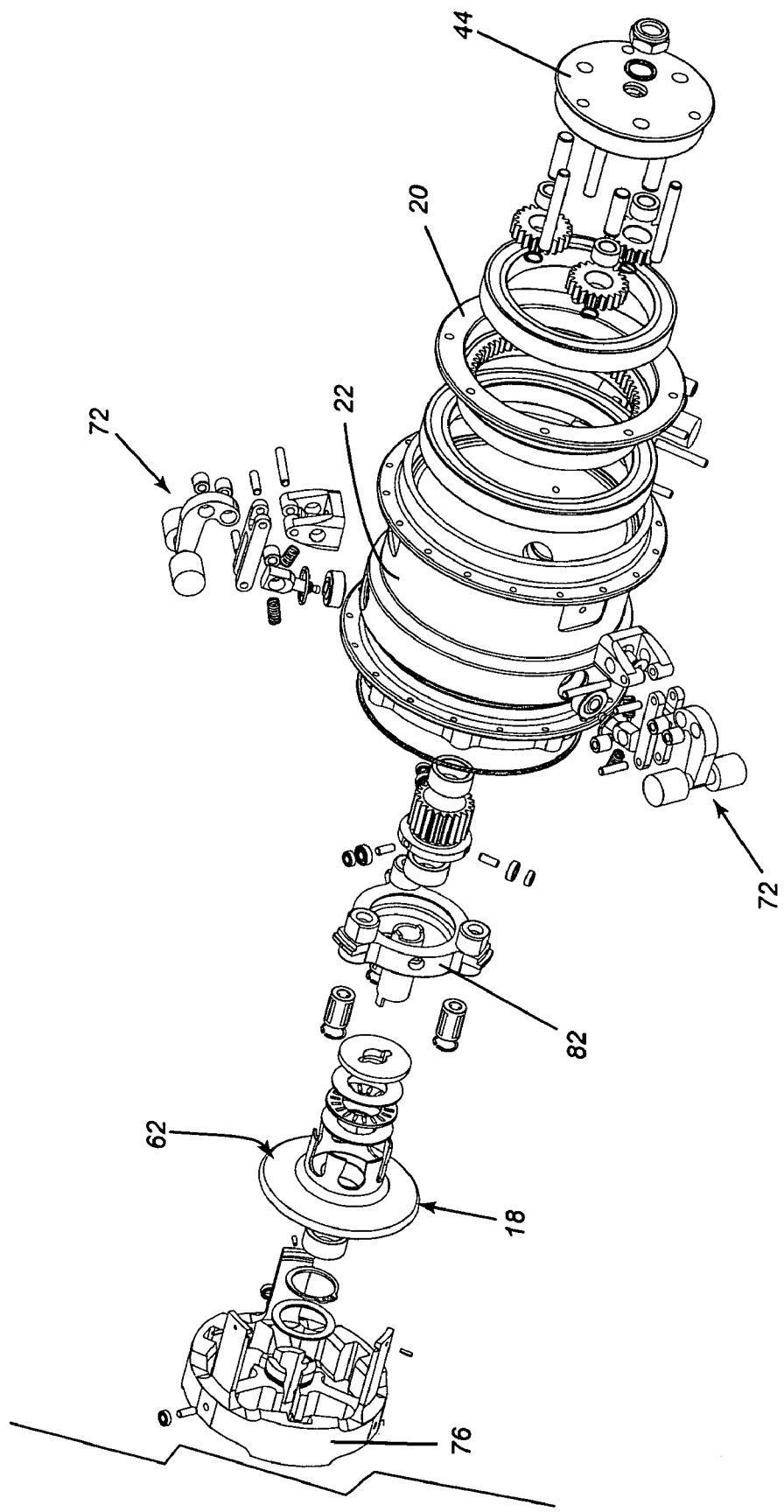
FIG. 6A, in a perspective exploded view, illustrates a portion of the transmission of FIG. 1.
Figure 6B:
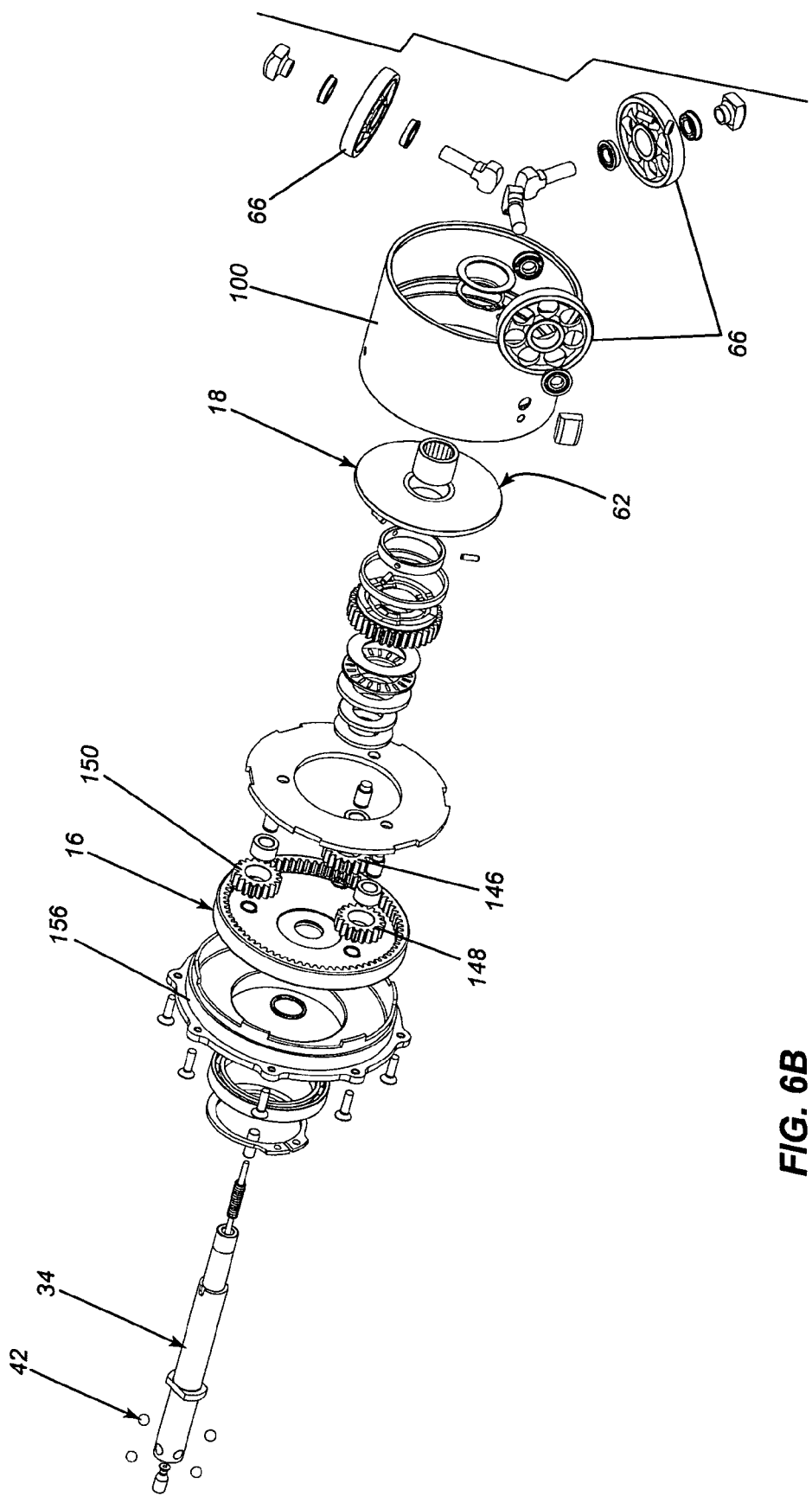
FIG. 6B, in a perspective exploded view, illustrates the remaining portion of the transmission of FIG. 1 illustrated partially on FIG. 6A.

Referring to FIG. 6B, the output stage 16 includes a sun gear 146, three planetary gears 148 and a peripheral gear 150. The planetary gears 148 engage the sun and peripheral gears 146 and 150. The output stage 16 further includes a fixed end plate 154 and a mobile end plate 156.

Referring to FIG. 3, the mobile end plate 156 is connected and rotates with the output member 22. The mobile end plate 156 is further connected to the fixed end plate 154 so as to be rotatable with respect thereto. The fixed end plate 154 is fixed to the axle 34.

The planetary gears 148 are mounted to the mobile end plate 156 such that they rotate with respect to their respective axis through axles 158 (shown in FIG. 2). The sun gear 146 is connected to the output toric disc 64 such that it rotates with this output toric disc 64. The peripheral gear 150 is connected to the fixed end plate 154.

In some embodiments of the invention, the fixed end plate 154 includes one or more indentations 160 for receiving corresponding protrusions (not shown in the drawings) present on the external device to which the variable ratio transmission 10 is attached. The indentations 160 and the protrusions help prevent the end plate 154 from rotating with respect to the external device.

As shown in the drawings, the output member 22 is located peripherally to the variable ratio transmission 10. As such, it forms with the fixed and mobile end plates 154 and 156, the stator 44 and the input member 20 a casing for the transmission. In addition, the output member 22 is separated from the input member 20 through a bearing 162 allowing the input member 20 and the output member 22 to rotate at different speeds.

In view of the above, the reader skilled in the art will appreciate that the output member 22 is rotatably mounted with respect to the stator 44, to the input member 20 and to the fixed end plate 154. The sun gear 146 is a directly rotating gear, the planetary gears 148 are counter-rotating gears and the output member 22 is a directly rotating component.

FIGS. 6A and 6B illustrate the variable ratio transmission 10 in an exploded view and therefore illustrate example of the individual components of the variable ratio transmission 10.

When some components of the variable ratio transmission 10 rotate with respect to each other, in some embodiments of the invention, either bearings or bushings are provided therebetween such as to facilitate such a rotation. Examples of suitable bearings include ball bearing and cylindrical bearings. However, any other means of connecting parts that move with respect to each other are also within the scope of the invention, including non-limitatively direct contact In addition, in a specific example of implementation, the variable ratio transmission 10 is built with seals located at appropriate locations such as to hermetically seal the variable ratio transmission 10. In this case, a traction oil is provided within the variable ratio transmission 10. The traction oil ensures that an optimal contact between the traction rollers 66 and the input and output toric discs 62 and 64 is provided. Such traction oils are well known in the art and will therefore not be described in further details.

In the drawings gears have been represented as having teeth. The reader skilled in the art will readily appreciate that wherever gears with teeth are described and illustrated, there is a possibility in some embodiments of the invention to replace them with rotating components that interact through friction with each other instead of through teeth.

In use, the variable ratio transmission 10 operates as follows. First, when the input member 20 is rotated, the gears of the input stage 12 increase a rotation speed within the variable ratio transmission 10, and more specifically at the input toric disc 62. In a specific example of implementation, this rotation speed is increased by a factor of three. However, other increases in rotation speed are within the scope of the invention.

Then, the actuating member 26 exert a force on the input toric disc 62, which causes this input toric disc 52 to rotate about the longitudinal axis. The input toric disc 62 in turn rotates the traction rollers 66 and the output toric disc 64. Finally, the output toric disc 64 in turn rotates the gears within the output stage 16, which in turn rotate the output member 22.

The output member 22 rotates with respect to the axle 34. If the output member 22 is attached to spokes of a wheel, the wheel rotates with respect to the axle 34. In this case, the input rotation at the input member 20 is transmitted within the transmission to the output member 22.

The ratio controller acts as follows. When the input torque is exerted onto the input member 20, the input torque is transmitted to the input stage 12 and then to the ratio defining surface 30 through the actuating member 26.

Since the ratio defining surface 30 is not collinear with the axle 34, there is a component of the force exerted on the indentations ratio defining surface 30 by the actuating member 26 that is parallel to the axle 34. This is because the actuating member 26 can only exert relatively large forces significant forces onto the ratio defining surface 30 along a direction perpendicular to the ratio defining surface 30. This component parallel to the axle 34 is directed such that a torque applied at the input of the variable ratio transmission 10 tends to move the actuating member 26, and therefore the peripheral support 100 away from the input stage 12. In some embodiments of the invention, an increase in torque reduces the transmission ratio.

The rotation speed sensitive component 72 acts as follows. When there is a rotation of the output member 22, the mass 126 moves away from the axle 34. This causes a motion of the peripheral support 100 resulting in an increase in the transmission ratio.

If there were no biasing elements, such as the springs 142, any small torque exerted at the input or any small speed of rotation would cause the transmission ratio of the variable ratio transmission assembly 18 to turn to the maximal value with no possibility of returning to another value. The springs 90 counter this tendency. Accordingly, when speed is reduced, the centrifugal force exerted on the mass 74 is reduced which causes the springs 90 to move peripheral support 100 such that the transmission ratio is reduced. Similarly, when the torque exerted at the input ring is reduced, the transmission ratio is also reduced because the springs 90 exert a force countering the reduced force transmitted by the actuating member 26.

In addition, the biasing element provides a force that increases as a function of the input torque or the output speed. Therefore, the longitudinal position of the peripheral support depends on the input torque and the output speed. Specifically, larger input torques and smaller output rotation speeds reduce the transmission ratio. This is consistent with the desired behavior described hereinabove.

Many alternative embodiments of the invention are possible. For example, in some embodiments of the invention, the input and output stages do not include planetary gear trains. In yet other embodiments of the invention, the transmission ratios of the input and output stages 12 and 16 do not produce a net transmission ratio of one. In this case, even when the intermediate stage has a transmission ratio of one, the transmission ratio between the input and the output of the variable ratio transmission 10 is not equal to one.

In yet other embodiments of the invention, the input and output stages 12 and 16 have an effect of reversing a speed of rotation. Accordingly, the output member 22 rotates in the counter rotation in these embodiments.

While the variable ratio transmission 10 includes three actuating member 26, in alternative embodiments of the invention, the transmission includes any suitable number of actuating members. Also, the exact number of planetary gears included in the input and output stages 12 and 14 is not critical to the invention and any suitable number of such gears is present in alternative embodiments of the invention.

Also, although the variable ratio transmission 10 includes three traction rollers 66, it is within the scope of the invention to have similar transmissions that have less or more than three traction rollers.

Although the present invention has been described hereinabove by way of preferred embodiments thereof, it can be modified, without departing from the spirit and nature of the subject invention as defined in the appended claims.

What is claimed is:

1. A variable ratio transmission for mechanically coupling an input member to an output member, said variable ratio transmission allowing the conversion of an input rotational motion of said input member into an output rotational motion of said output member, said input rotational motion having an input speed and an input torque and said output rotational motion having an output speed and an output torque, said variable ratio transmission comprising:

a variable ratio transmission assembly mechanically coupled to the input member and to the output member for rotating the output member at the output speed in response to the input member being rotated at the input speed, said variable ratio transmission assembly defining a transmission ratio between the output speed and the input speed, said transmission ratio being variable; and a ratio controller mechanically coupled to said variable ratio transmission assembly and to the input member for automatically adjusting the transmission ratio as a function of the input torque, said ratio controller including:

an actuating member mechanically coupled to the input member; and a ratio defining component including a ratio defining surface, said ratio defining component being mechanically coupled to said actuating member and to said variable ratio transmission assembly for transmitting the input torque to said variable ratio transmission assembly, said ratio defining surface being disposed such that a variation in the input torque causes a predetermined variation of said transmission ratio;

said actuating member being mechanically coupled to said variable ratio transmission assembly in a manner such that a movement of said actuating member relatively to said ratio defining surface causes said predetermined variation of said transmission ratio;

said actuating member being mechanically coupled to said ratio defining component such that said variation in the input torque causes said actuating member to move in a predetermined direction relatively to said ratio defining component;

said actuating member being movable along said ratio defining surface between a high ratio position wherein said transmission ratio is maximal and a low ratio position wherein said transmission ratio is minimal, said variable ratio transmission further comprising a biasing element for biasing said actuating member towards an equilibrium position;

said ratio defining component including a substantially cylindrical shell defining a longitudinal axis, said cylindrical shell defining a shell internal surface and a shell external surface, said cylindrical shell including an aperture extending between said shell internal surface and said shell external surface, said ratio defining surface extending at the periphery of said aperture between said shell internal surface and said shell external surface, said ratio defining surface having a pitch relatively to said longitudinal axis;

said variable ratio transmission assembly including a toroidal transmission stage, said toroidal transmission stage including:
an input disc mechanically coupled to and driven by the input member;
an output disc mechanically coupled to and driving the output member, said output disc being rotatable relative to said input disc;
a plurality of traction rollers interposed between said input disc and said output disc; and
a plurality of substantially elongated support members each supporting a respective traction rollers, said support members defining each a respective roller longitudinal axis about which said respective traction roller is rotatable,
wherein said support members are mechanically coupled to said actuating member so that said movement of said actuating member relatively to said ratio defining surface causes said predetermined variation of said transmission ratio by changing an orientation of said roller longitudinal axes relatively to said input and output discs.

2. A variable transmission as defined in claim 1, wherein said actuating member includes a pin extending substantially radially within said aperture and contacting said ratio defining surface.

3. A variable transmission as defined in claim 2, wherein said pin supports a roller extending substantially perpendicularly thereto, said roller being rollable onto said ratio defining surface.

4. A variable ratio transmission as defined in claim 1, wherein said pitch is constant between said minimal ratio position and said maximal ratio position.

5. A variable ratio transmission as defined in claim 1, wherein said pitch decreases linearly between said maximal ratio position and said minimal ratio position.

6. A variable ratio transmission as defined in claim 1, wherein said pitch decreases sinusoidally between said maximal ratio position and said minimal ratio position.

7. A variable ratio transmission for mechanically coupling an input member to an output member, said variable ratio transmission allowing the conversion of an input rotational motion of said input member into an output rotational motion of said output member, said input rotational motion having an input speed and an input torque and said output rotational motion having an output speed and an output torque, said variable ratio transmission comprising:
a variable ratio transmission assembly mechanically coupled to the input member and to the output member for rotating the output member at the output speed in response to the input member being rotated at the input speed, said variable ratio transmission assembly defining a transmission ratio between the output speed and the input speed, said transmission ratio being variable;
a ratio controller mechanically coupled to said variable ratio transmission assembly and to the input member for automatically adjusting the transmission ratio as a function of the input torque, said ratio controller including
an actuating member mechanically coupled to the input member; and
a ratio defining component including a ratio defining surface, said ratio defining component being mechanically coupled to said actuating member and to said variable ratio transmission assembly for transmitting the input torque to said variable ratio transmission assembly, said ratio defining surface being disposed such that a variation in the input torque causes a predetermined variation of said transmission ratio; and
a speed dependent ratio adjusting assembly mechanically coupled to said variable ratio transmission assembly, said speed dependent ratio adjusting assembly being configured such that a variation in the output speed causes another predetermined variation of said transmission ratio.

8. A variable ratio transmission as defined in claim 7, wherein said transmission ratio is increased when the output speed increases.

9. A variable ratio transmission for mechanically coupling an input member to an output member, said variable ratio transmission allowing the conversion of an input rotational motion of said input member into an output rotational motion of said output member said input rotational motion having an input speed and an input torque and said output rotational motion having an output speed and an output torque, said variable ratio transmission comprising:
a variable ratio transmission assembly mechanically coupled to the input member and to the output member for rotating the output member at the output speed in response to the input member being rotated at the input speed, said variable ratio transmission assembly defining a transmission ratio between the output speed and the input speed, said transmission ratio being variable; and
a ratio controller mechanically coupled to said variable ratio transmission assembly and to the input member for automatically adjusting the transmission ratio as a function of the input torque, said ratio controller including
an actuating member mechanically coupled to the input member; and
a ratio defining component including a ratio defining surface, said ratio defining component being mechanically coupled to said actuating member and to said variable ratio transmission assembly for transmitting the input torque to said variable ratio transmission assembly, said ratio defining surface being disposed such that a variation in the input torque causes a predetermined variation of said transmission ratio;
said variable ratio transmission including an input stage mechanically coupled to said input member and to said variable ratio transmission assembly, said input stage driving said variable ratio transmission assembly at a variable ratio transmission assembly input rotational speed, said input stage increasing said variable ratio transmission assembly input rotational speed by a first predetermined factor relatively to said input speed;
said variable ratio transmission including an output stage mechanically coupled to said output member and to said variable ratio transmission assembly, said output stage being driven by said variable ratio transmission assembly at a variable ratio transmission assembly output rotational speed, said output stage decreasing said variable transmission assembly output rotational speed by a second predetermined factor relatively to said output speed.

10. A variable transmission as defined in claim 9, wherein said first and second predetermined factors are substantially equal.

* * * * *